US012394390B2

(12) United States Patent
Shigeta

(10) Patent No.: US 12,394,390 B2
(45) Date of Patent: Aug. 19, 2025

(54) SOURCE DRIVER HAVING CHARGE SHARE LINE CONNECTING OUTPUT LINES AND DISPLAY APPARATUS

(71) Applicant: LAPIS Technology Co., Ltd., Yokohama (JP)

(72) Inventor: Kenichi Shigeta, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/603,157

(22) Filed: Mar. 12, 2024

(65) Prior Publication Data

US 2024/0312430 A1 Sep. 19, 2024

(30) Foreign Application Priority Data

Mar. 14, 2023 (JP) ................................ 2023-039255

(51) Int. Cl.
*G09G 3/36* (2006.01)

(52) U.S. Cl.
CPC ... *G09G 3/3696* (2013.01); *G09G 2320/0247* (2013.01); *G09G 2320/045* (2013.01); *G09G 2330/021* (2013.01)

(58) Field of Classification Search
CPC .................................................... G09G 3/3696
USPC ........................................................... 345/55
See application file for complete search history.

(56) References Cited

U.S. PATENT DOCUMENTS

2012/0280961 A1* 11/2012 Son ...................... G09G 3/3685 345/87
2014/0320464 A1* 10/2014 Ryu ..................... G09G 3/3688 345/204

FOREIGN PATENT DOCUMENTS

JP 2002149120 5/2002

* cited by examiner

*Primary Examiner* — Long D Pham
(74) *Attorney, Agent, or Firm* — JCIPRNET

(57) ABSTRACT

A source driver includes: output amplifiers, supplying pixel drive voltages to source lines of a display device based on a video signal; a charge share line, having a charge share switch able to connect output lines outputting the pixel drive voltages; a common voltage line, connected to a common voltage electrode of the display device; a first power supply line, supplying a first voltage; a switch part, able to connect the charge share line and the common voltage line with the first power supply line; and a control part, including a power off detection circuit that detects stoppage of supply of the first voltage. When it is detected that the first power supply line is off, the control part short-circuits the source lines by the charge share line and connects the charge share line and the common voltage line with the first power supply line by the switch part.

8 Claims, 9 Drawing Sheets

SOURCE DRIVER HAVING CHARGE SHARE LINE CONNECTING OUTPUT LINES AND DISPLAY APPARATUS

CROSS-REFERENCE TO RELATED APPLICATIONS

This application claims the priority benefit of Japan Application No. 2023-039255, filed on Mar. 14, 2023. The entirety of the above-mentioned patent application is hereby incorporated by reference herein and made a part of this specification.

BACKGROUND

Technical Field

The disclosure relates to a source driver and a display apparatus.

Related Art

In general, an increase in size of a thin film transistor (TFT) liquid crystal display apparatus panel causes an increase in pixel capacitance of a thin film transistor. As the pixel capacitance increases, electric charge written to a pixel is not immediately removed when the power is off, and the screen of the display panel may flicker.

Japanese Patent Laid-open No. 2002-149120 discloses the following technology: in a liquid crystal display apparatus, in order to reduce disturbances to a liquid crystal screen when supply of a power supply voltage is stopped, white writing is performed on the entire screen and then the power supply at pixel voltage or common voltage is sequentially stopped.

However, while Japanese Patent Laid-open No. 2002-149120 discloses a basic configuration of supplying the pixel voltage or common voltage in the liquid crystal display apparatus, it is not a technology in which the common voltage (VCOM voltage) is connected on a printed circuit board and the VCOM voltage is removed by each source driver. Thus, there is a problem that a falling speed (turn-off time toff) of the common voltage is not sufficiently short.

SUMMARY

A source driver of the disclosure includes: a plurality of output amplifiers, supplying a plurality of pixel drive voltages respectively corresponding to a plurality of pixels to each of a plurality of source lines of a display device based on a video signal; a charge share line, having a charge share switch provided to be able to connect output lines outputting the pixel drive voltages of the plurality of output amplifiers; a common voltage line, connected to a common voltage electrode of the display device; a first power supply line, supplying a first voltage; a switch part, provided to be able to connect the charge share line and the common voltage line with the first power supply line; and a control part, including a power off detection circuit that detects stoppage of supply of the first voltage from the first power supply line. When the power off detection circuit detects that the first power supply line is off, the control part short-circuits the plurality of source lines by the charge share line and connects the charge share line and the common voltage line with the first power supply line by the switch part.

A display apparatus of the disclosure includes a display device and a source driver. The source driver includes: a plurality of output amplifiers, supplying a plurality of pixel drive voltages respectively corresponding to a plurality of pixels to each of a plurality of source lines of the display device based on a video signal; a charge share line, having a charge share switch provided to be able to connect output lines outputting the pixel drive voltages of the plurality of output amplifiers; a common voltage line, connected to a common voltage electrode of the display device; a first power supply line, supplying a first voltage; a switch part, provided to be able to connect the charge share line and the common voltage line with the first power supply line; and a control part, including a power off detection circuit that detects stoppage of supply of the first voltage from the first power supply line. When the power off detection circuit detects that the first power supply line is off, the control part short-circuits the plurality of source lines by the charge share line and connects the charge share line and the common voltage line with the first power supply line by the switch part.

DESCRIPTION OF THE EMBODIMENTS

Figure 1:
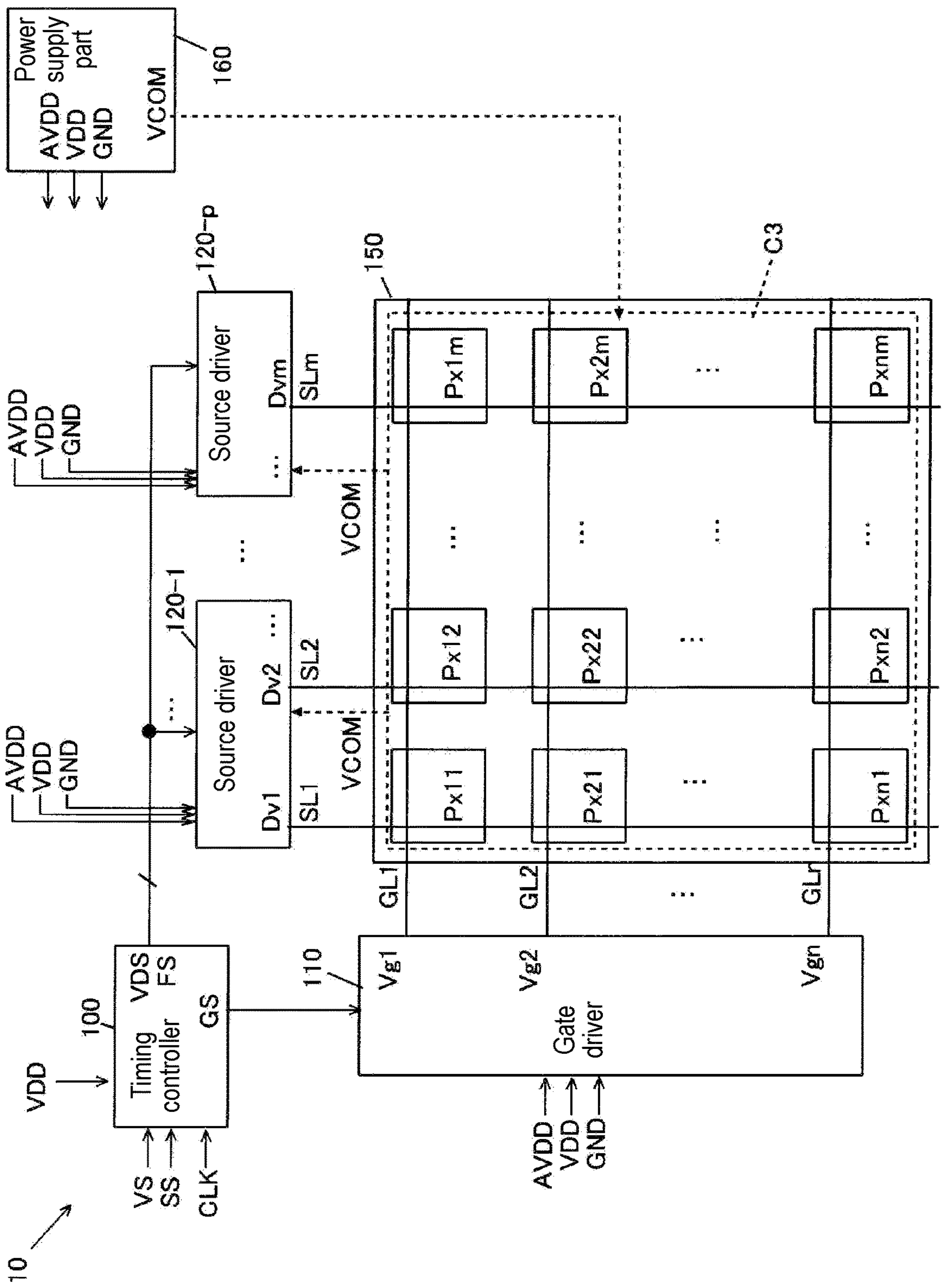
FIG. 1 is a block diagram illustrating a configuration of a display apparatus according to an embodiment of the disclosure.

The disclosure provides a source driver and a display apparatus in which a common voltage of a common voltage line can be quickly removed via a charge share line or a first power supply line.

According to the disclosure, since a common voltage of the common voltage line can be quickly removed via the charge share line or the first power supply line, screen flickering when the power is turned off can be quickly suppressed.

Hereinafter, a source driver and a display apparatus of embodiments and examples of the disclosure will be described with reference to the drawings. In the embodiments and examples, components having substantially the same functions and configurations are assigned the same reference numerals, and repeated description is thus omitted.

Description of Embodiment

FIG. 1 is a block diagram illustrating a configuration of a display apparatus 10 according to an embodiment of the disclosure. The display apparatus 10 is an active matrix drive type liquid crystal display apparatus. The display apparatus 10 includes a timing controller 100, a gate driver 110, source drivers 120-1 to 120-*p*, a display panel 150 (display device), and a power supply part 160. One of the source drivers 120-1 to 120-*p* is also simply referred to as source driver 120.

The power supply part 160 supplies a digital voltage VDD (first voltage), an analog voltage AVDD (second voltage), VCOM (common voltage) and a ground potential (GND) to the timing controller 100, the gate driver 110, the source drivers 120-1 to 120-*p*, and the display panel 150 as appropriate.

The display panel 150 is configured in which gate lines GL1 to GLn (n is an integer of 2 or more) extending in a horizontal direction of a two-dimensional screen and source lines SL1 to SLm (m is an integer of 2 or more) extending in a vertical direction of the two-dimensional screen are arranged intersecting each other on a main surface of a substrate of the display panel 150. The source drivers 120-1 to 120-*p* are provided for each predetermined number of source lines, and drive the source lines SL1 to SLm of the display panel 150 by p source drivers (p is an integer greater than 1) in total. The gate driver 110 drives the gate lines GL1 to GLn. One of the gate lines GL1 to GLn is also simply referred to as gate line GL, and one of the source lines SL1 to SLm is also simply referred to as source line SL.

A plurality of pixel portions Px11 to Pxnm are respectively provided at intersections of the gate lines GL1 to GLn and the source lines SL1 to SLm, and are arranged in a matrix. One of the pixel portions Px11 to Pxnm is also simply referred to as pixel portion Px.

Figure 2:
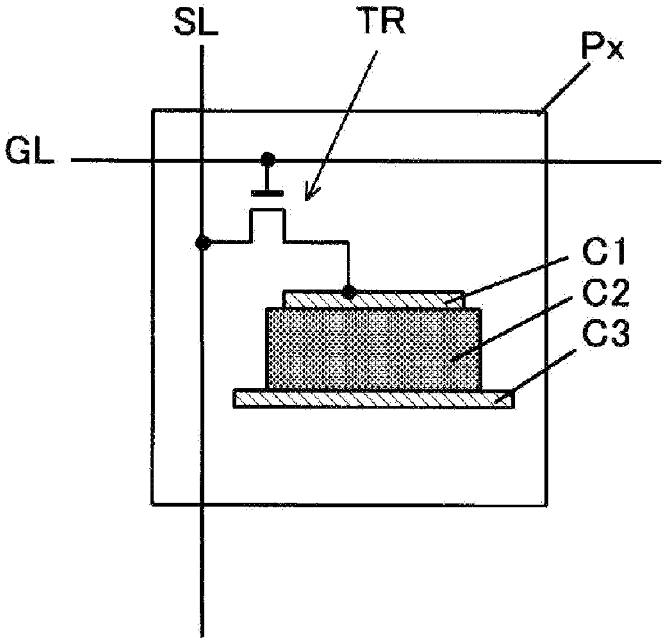
FIG. 2 schematically illustrates a structure of one pixel portion among a plurality of pixel portions of a display panel of a display apparatus according to an embodiment.

FIG. 2 schematically illustrates a structure of one pixel portion Px among the pixel portions Px11 to Pxnm of the display panel 150 of the display apparatus 10.

As illustrated in FIG. 2, the pixel portion Px includes a pixel electrode C1, a liquid crystal layer C2, and a counter substrate electrode C3 that are stacked together, and, for example, an nMOS transistor as a pixel switch TR of an on-off switch.

The pixel electrode C1 is a transparent electrode provided independently for each of the pixel portions Px11 to Pxnm, and the counter substrate electrode C3 is a single transparent electrode covering the entire surface of the display panel 150. A control terminal of the pixel switch TR is connected to the gate line GL, and a source terminal of the pixel switch TR is connected to the source line SL. Furthermore, a drain terminal of the pixel switch TR is connected to the pixel electrode C1. A counter substrate voltage (common voltage VCOM) as a common voltage is applied to the counter substrate electrode C3.

As illustrated in FIG. 1, each of the pixel switches TR of the pixel portions Px11 to Pxnm is controlled to be turned on or off according to gate signals Vg1 to Vgn supplied from the gate driver 110.

The pixel portions Px11 to Pxnm are supplied with a plurality of pixel drive voltages (gradation voltages) corresponding to video data from the source driver 120. Specifically, drive voltage signals Dv1 to Dvm are output from the source driver 120 to the source lines SL1 to SLm, and when the pixel switches TR of the pixel portions Px11 to Pxnm are respectively turned on, the drive voltage signals Dv1 to Dvm are applied to the pixel portions Px11 to Pxnm. Accordingly, the pixel electrode of each of the pixel portions Px11 to Pxnm is charged, and luminance is controlled.

In the case where the display apparatus 10 is a liquid crystal display apparatus, each of the pixel portions Px11 to Pxnm includes a transparent electrode connected to the source lines SL1 to SLm via the pixel switch TR, and liquid crystal sealed between a semiconductor substrate and a counter substrate, the counter substrate being provided facing the semiconductor substrate and having one transparent common electrode (common voltage electrode) formed over the entire panel surface. With respect to a backlight inside the display apparatus, display is performed by changing the transmittance of the liquid crystal according to a potential difference between a drive voltage (gradation voltage) applied to the pixel portions Px11 to Pxnm and the counter substrate voltage.

Based on video data VS, the timing controller 100 generates a sequence (serial signal) of pixel data pieces representing a luminance level of each pixel using, for example, 256 levels of luminance gradation of 8 bits. Based on a synchronization signal SS, the timing controller 100 generates an embedded clock type clock signal CLK having a constant clock period. The timing controller 100 generates a video data signal VDS which is a serial signal in which the sequence of pixel data pieces and the clock signal CLK are integrated, supplies the video data signal VDS to the source driver 120 and controls the display of video data. The video data signal VDS is configured as a video data signal serialized according to the number of transmission paths for each predetermined number of source lines.

In the present embodiment, the video data signal VDS corresponding to one frame is configured by serially continuing n pixel data piece groups each including m pixel data pieces (m channels). Each of the n pixel data piece groups is a pixel data piece group including pixel data pieces corresponding to a gradation voltage to be supplied to the pixels on one horizontal scanning line (that is, each of the gate lines GL1 to GLn). By an operation of the source driver 120, based on m×n pixel data pieces, the drive voltage signals Dv1 to Dvm to be supplied to n×m pixel portions (that is, pixel portions P11 to Pnm) are applied via the source lines SL1 to SLm.

Based on the synchronization signal SS, the timing controller 100 generates a frame synchronization signal FS indicating a timing of each frame of the video data signal VDS (video signal) and supplies the same to the source drivers 120-1 to 120-*p*.

Based on the synchronization signal SS, the timing controller 100 generates a gate control signal GS that controls an operation timing of the gate driver 110 and supplies the same to the gate driver 110.

The gate driver 110 is supplied with the gate control signal GS from the timing controller 100, and sequentially supplies the gate signals Vg1 to Vgn to the gate lines GL1 to GLn based on a clock timing included in the gate control signal GS. By the supply of the gate signals Vg1 to Vgn, the pixel portions Px11 to Pxnm are selected for each pixel row. By applying the drive voltage signals Dv1 to Dvm from the source driver 120 to the selected pixel portions, the gradation voltage is written to the pixel electrode of the pixel portions Px11 to Pxnm.

In other words, by an operation of the gate driver 110, the m pixel portions arranged along (that is, in a row) an extension direction of a gate line are selected as a target to which the drive voltage signals Dv1 to Dvm are supplied. The source driver 120 applies the drive voltage signals Dv1 to Dvm to the selected pixel portions in a row, and causes a color corresponding to the voltage to be displayed. By selectively switching between the pixel portions in a row selected as the target to which the drive voltage signals Dv1 to Dvm are supplied and repeating them in an extension direction (that is, vertical direction) of a source line, screen display corresponding to one frame is performed.

The source drivers 120-1 to **120-*p* are supplied with the video data signal VDS from the timing controller 100**, generate the drive voltage signals Dv1 to Dvm corresponding to a multilevel gradation voltage according to the number of gradations indicated in the video data signal VDS, and apply the drive voltage signals Dv1 to Dvm to the pixel portions Px11 to Pxnm via the source lines SL1 to SLm. In the following description, the drive voltage signals Dv1 to Dvm are also referred to as gradation voltage signals Dv1 to Dvm. One of the gradation voltage signals Dv1 to Dvm is also simply referred to as gradation voltage signal Dv.

The source drivers 120-1 to **120-*p* are provided for each predetermined number of source lines obtained by dividing the source lines SL1 to SLm. The number of source lines driven by each source driver corresponds to the number of output channels of the source driver. Each of the source drivers 120-1 to 120-*p*** is formed on a different semiconductor integrated circuit (IC) chip.

Each of the source drivers 120-1 to **120-*p* has a common configuration. In the following description, when describing such a common configuration, the source drivers 120-1 to 120-*p* will also be collectively referred to simply as "source driver 120**."

Figure 3:
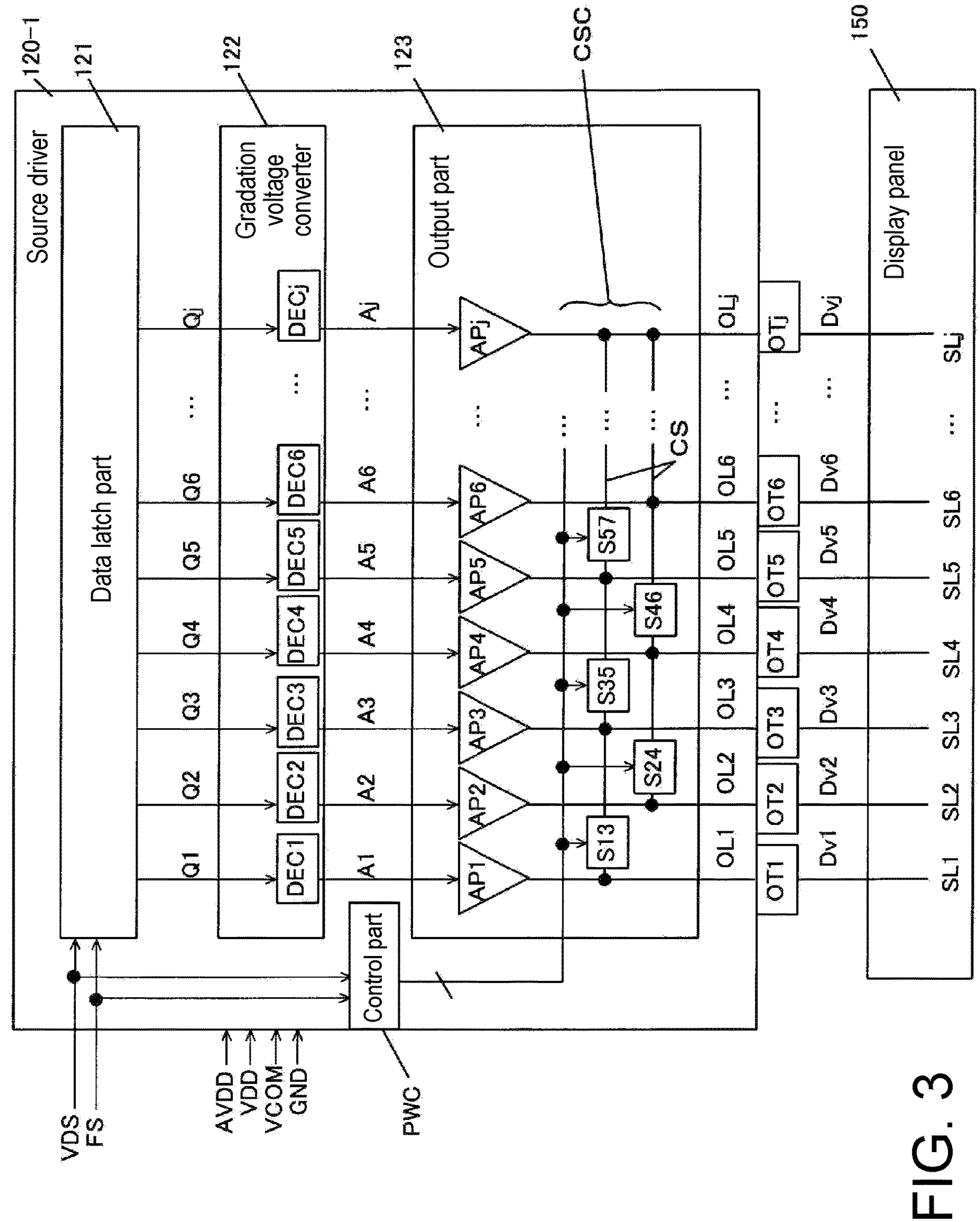
FIG. 3 is a block diagram illustrating a portion of an internal configuration of a source driver of a display apparatus according to an embodiment.

FIG. 3 is a block diagram illustrating an internal configuration of the source driver 120-1 illustrated in FIG. 1. The source driver 120 includes a data latch part 121, a gradation voltage converter 122, and an output part 123.

The data latch part 121 sequentially captures the sequence of pixel data pieces included in the video data signal VDS supplied from the timing controller 100. In response to capturing of pixel data pieces corresponding to j channels ($j<m$, and $j \times p = m$), the data latch part 121 outputs the captured pixel data pieces as pixel data Q1 to Qj to the gradation voltage converter 122.

The gradation voltage converter 122 converts each of the pixel data Q1 to Qj supplied from the data latch part 121 into gradation voltages A1 to Aj of positive polarity or negative polarity having a voltage value corresponding to the luminance gradation represented by the pixel data, and supplies the same to the output part 123.

That is, the gradation voltage converter 122 includes positive decoders DEC1, DEC3, DEC5 and so on that generate a gradation voltage of positive polarity, and negative decoders DEC2, DEC4, DEC6 and so on that generate a gradation voltage of negative polarity. These positive decoders and negative decoders are also collectively referred to simply as "decoder DEC."

Each of the positive decoders DEC1, DEC3, DEC5 and so on and the negative decoders DEC2, DEC4, DEC6 and so on converts a reference voltage selected from a generation circuit (not illustrated) based on the pixel data Q1 to Qj, and supplies the same as an input signal according to output polarity to the corresponding output amplifiers AP1 to APj. These output amplifiers AP1 to APj are also collectively referred to simply as "output amplifier AP."

The output part 123 generates, as the gradation voltage signals Dv1 to Dvj, signals obtained by amplifying the gradation voltages A1 to Aj of positive polarity or negative polarity, and outputs the same to source output ends OT1 to OTj. These source output ends OT1 to OTj are also collectively referred to simply as "source output end OT."

The output amplifiers AP1 to APj are configured by alternately arranging an output amplifier to which the gradation voltage signal Dv of positive polarity is applied and an output amplifier to which the gradation voltage signal Dv of negative polarity is applied. That is, the gradation voltage signals Dv of mutually different polarities are supplied to adjacent ones of the output amplifiers AP1 to APj. For example, output ends of the positive decoders DEC1, DEC3, DEC5 and so on are connected to the output amplifiers AP1, AP3, AP5 and so on. Output ends of the negative decoders DEC2, DEC4, DEC6 and so on are connected to the output amplifiers AP2, AP4, AP6 and so on.

Output lines OL1, OL3, OL5 and so on that output the gradation voltage signal Dv of positive polarity of the output amplifiers AP1, AP3, AP5 and so on are connected to the source output ends OT1, OT3, OT5 and so on. Output lines OL2, OL4, OL6 and so on that output the gradation voltage signal Dv of negative polarity of the negative decoders DEC2, DEC4, DEC6 and so on are connected to the source output ends OT2, OT4, OT6 and so on. These output lines OL1 to OLj are also collectively referred to simply as "output line OL."

To reduce power consumption, the source driver 120 of the present embodiment is provided with a charge share circuit CSC across the output lines OL1 to OLj of the output amplifiers AP1 to APj. The charge share circuit CSC is controlled by a control part PWC, and includes charge share lines CS1 and CS2 as well as charge share switches S13, S35, S57 and so on and charge share switches S24, S46, S68 and so on (these charge share switches are each also simply referred to as charge share switch CSSW). The charge share circuit CSC is the following circuit. That is, the charge share switch CSSW is controlled to be turned on or off by the control part PWC, and the output lines OL of the same polarity that output the gradation voltage signal Dv are temporarily short-circuited, thereby neutralizing electric charge accumulated in the source lines SL1 to SLj connected to the source output ends OT1 to OTj for charge sharing. For example, the charge share switch S13 is provided to be able to connect the output lines OL1 and OL3, the charge share switch S35 is provided to be able to connect the output lines OL3 and OL5, and the charge share switch S57 is provided to be able to connect the output lines OL5 and OL7. The charge share switch S24 is provided to be able to connect the output lines OL2 and OL4, the charge share switch S46 is provided to be able to connect the output lines OL4 and OL6, and the charge share switch S68 is provided to be able to connect the output lines OL6 and OL8. The charge share lines CS1 and CS2 are also simply referred to as charge share line CS. The control part PWC also controls potentials of a line of the digital voltage VDD (first voltage), a line of the analog voltage AVDD (second voltage), a line of VCOM (common voltage) and a line of the ground potential (GND), which are not illustrated here (details will be described later).

In recent years, source line load (especially load capacity) has greatly increased due to large screens of display panels, which has caused problems such as an increase in power consumption of a source driver and the resultant high heat generation. Charge share driving becomes an effective method for mitigating heat generation by reusing part of charged or discharged electric charge of source line load capacitance.

The charge share lines CS1 and CS2 are provided for each output polarity of an output amplifier. For example, since an odd-numbered output amplifier outputs a positive polarity gradation voltage and an even-numbered output amplifier outputs a negative polarity gradation voltage in a certain frame period, the charge share line CS1 can be connected with the source output ends OT1, OT3, OT5 and so on of the odd-numbered output amplifiers via the charge share switches S13, S35, S57 and so on in an ON state. Similarly, the charge share line CS2 can be connected with the source output ends OT2, OT4, OT6 and so on of the even-numbered output amplifiers via the charge share switches S24, S46, S68 and so on in the ON state.

The on/off control of these charge share switches CSSW is set in units of each frame period. In the case where each frame period includes a first period from a start time and a second period subsequent to the first period, for example, the charge share switches S13, S35, S57 and so on are controlled to be turned on during the first period and turned off during the second period. Accordingly, during the first period, source line loads to be driven by a positive polarity voltage are electrically connected to each other via the charge share line CS1, and positive polarity voltages of each source line load driven during the previous frame period are averaged. Similarly, source line loads to be driven by a negative polarity voltage are electrically connected to each other via the charge share line CS2, and negative polarity voltages of each source line load driven during the previous frame period are averaged.

Example 1

Figure 4:
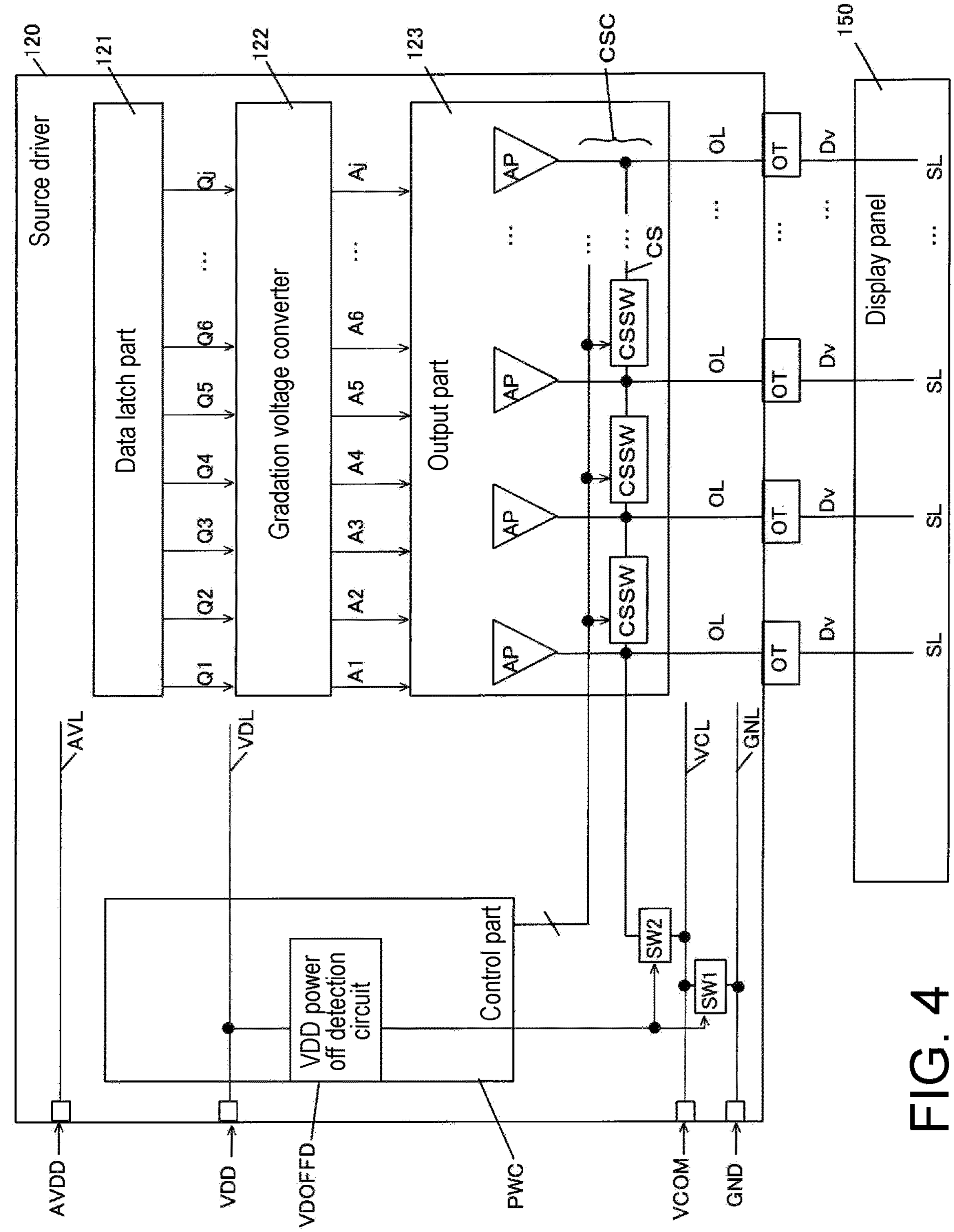
FIG. 4 is a block diagram illustrating an internal configuration of a source driver according to Example 1 of the disclosure.

FIG. 4 is a block diagram illustrating a portion of an internal configuration of the source driver 120 of Example 1. In the present example, the source driver 120-1 illustrated in FIG. 3 is identical to that of the above embodiment except for the following configuration. The control part PWC that controls a switch part (a normally-off first switch SW1 that is able to connect the charge share line CS to a VCOM voltage line VCL (common voltage line), and a normally-off second switch SW2 that is able to connect the VCOM voltage line VCL to a ground line GNL) includes a VDD power off detection circuit VDOFFD (power off detection circuit) that detects stoppage of supply of the VDD voltage from a VDD voltage line VDL. When the VDD power off detection circuit VDOFFD detects that the VDD voltage line VDL (first power supply line) is off (the VDD voltage drops to a predetermined threshold), the control part PWC short-circuits a plurality of source lines SL by the charge share line CS, and connects the charge share line CS and the VCOM voltage line VCL with the ground line GNL by the switch part. In the output part 123 of the source driver 120 illustrated in FIG. 4, output amplifiers are labeled AP, output lines are labeled OL, source output ends are labeled OT, charge share switches are labeled CSSW, and gradation voltage signals are labeled Dv; in the display panel 150, source lines are labeled SL.

In Example 1, inside the source driver 120, the VDD power off detection circuit VDOFFD detects that the power is off, all the output voltages (pixel voltages) of the source driver are short-circuited by the charge share line CS, and are short-circuited to the ground line GNL via the first switch SW1 that is able to connect the charge share line CS to the VCOM voltage line VCL and the second switch SW2 that is able to connect the VCOM voltage line VCL to the ground line GNL.

In the short-circuiting configuration of Example 1 like this, a path to remove the VCOM voltage of the VCOM voltage line VCL changes from the VCOM voltage line VCL to the charge share line CS and the ground line GNL. A time from when the power is turned off to when a VCOM potential of the VCOM voltage line VCL is removed is determined by the switch size of the first switch SW1 that is able to connect the charge share line CS to the VCOM voltage line VCL and the second switch SW2 that is able to connect the VCOM voltage line VCL to the ground line GNL or wiring resistance of the charge share line CS. Thus, in the case of further shortening screen flickering time, the size of the first switch SW1 and the second switch SW2 or the wiring width should be taken into consideration.

According to the present example, by conduction of the charge share line CS by the charge share switch CSSW controlled by the control part PWC, it becomes possible to collect the electric charge accumulated in the source line SL (pixel portion Px) and drop the same to the ground line GNL. Accordingly, screen flickering when the power is turned off can be quickly suppressed.

Example 2

Figure 5:
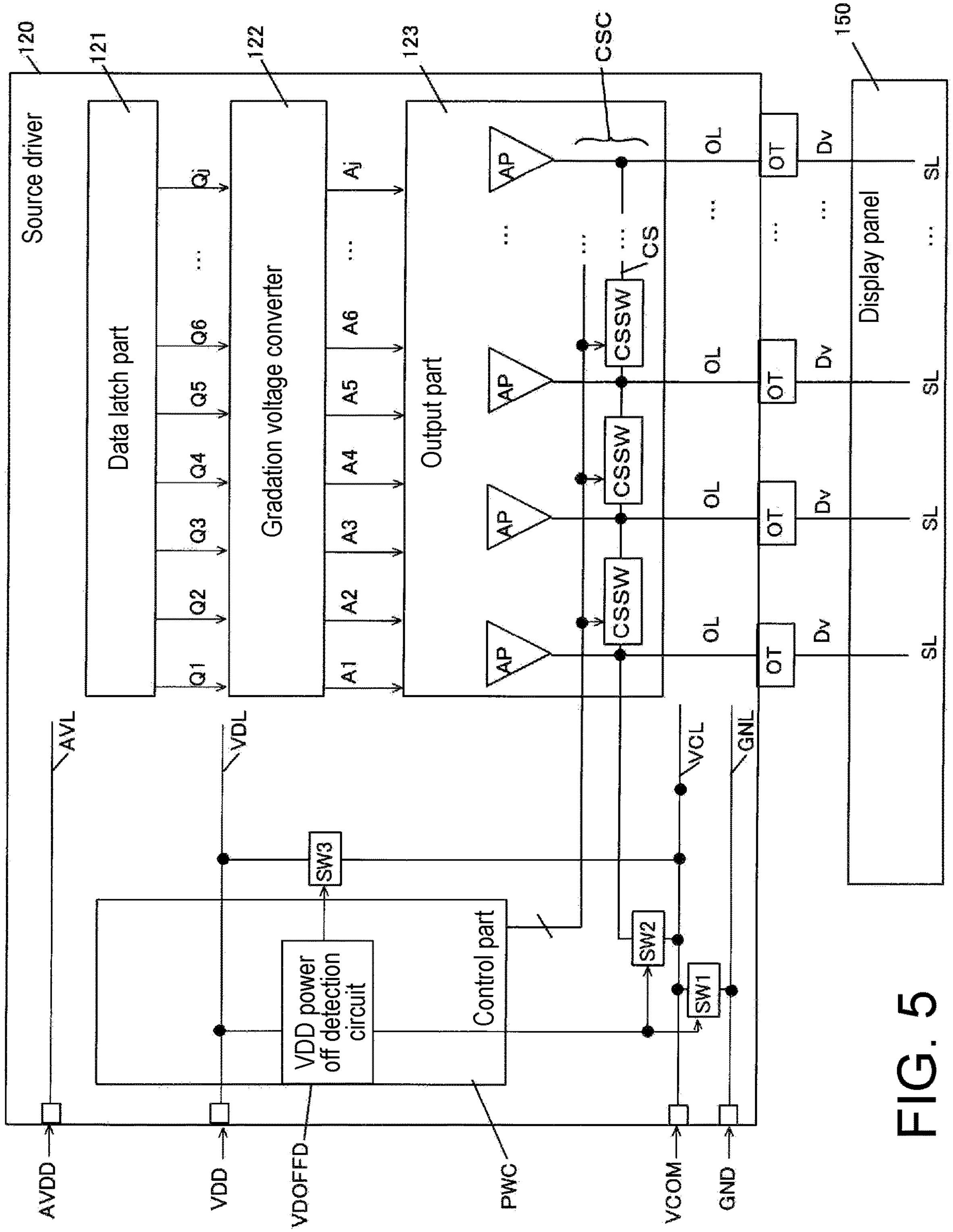
FIG. 5 is a block diagram illustrating an internal configuration of a source driver according to Example 2 of the disclosure.

FIG. 5 is a block diagram illustrating an internal configuration of the source driver 120 of Example 2. In the present example, the source driver 120 illustrated in FIG. 4 is identical to that of Example 1 except for the following configuration. The control part PWC that controls the switch part (the first switch SW1 that is able to connect the charge share line CS to the VCOM voltage line VCL, the second switch SW2 that is able to connect the VCOM voltage line VCL to the ground line GNL, and a normally-off third switch SW3 that is able to connect the VDD voltage line VDL to the VCOM voltage line VCL) includes the VDD power off detection circuit VDOFFD that detects stoppage of supply of the VDD voltage from the VDD voltage line VDL. When the VDD power off detection circuit VDOFFD detects that the VDD voltage line VDL is off (the VDD voltage drops to the predetermined threshold), the control part PWC short-circuits a plurality of source lines SL by the charge share line CS, connects the charge share line CS and the VCOM voltage line VCL with the ground line GNL by the first switch SW1 and the second switch SW2, and connects the VDD voltage line VDL to the VCOM voltage line VCL by the third switch SW3.

In Example 2, after the VDD power off detection circuit VDOFFD detects a VDD potential change in the VDD voltage line VDL when the power is turned off, the VCOM voltage of the VCOM voltage line VCL is removed via the ground line GNL and the VDD voltage line VDL inside the source driver 120.

Specifically, in Example 2, by providing the third switch SW3 that is able to connect the VDD voltage line VDL to the VCOM voltage line VCL in addition to the first switch SW1 that is able to connect the charge share line CS to the VCOM voltage line VCL and the second switch SW2 that is able to connect the VCOM voltage line VCL to the ground line GNL of Example 1, when the VDD potential of the VDD voltage line VDL drops, by turning on the first switch SW1, the second switch SW2 and the third switch SW3, the VCOM potential of the VCOM voltage line VCL can be removed via the ground line GNL and the VDD voltage line VDL (the VDD potential at this time is GND potential).

According to Example 2, in addition to the effects of Example 1, screen flickering when the power is turned off can be more quickly suppressed than the short-circuiting method of Example 1. The switch size or the wiring width of the VCOM voltage line VCL when the power is turned off can be made smaller than the short-circuiting configuration of Example 1, and the cost of a source driver chip can be reduced. That is, display quality of a liquid crystal display apparatus can be improved without increasing costs.

Figure 6:
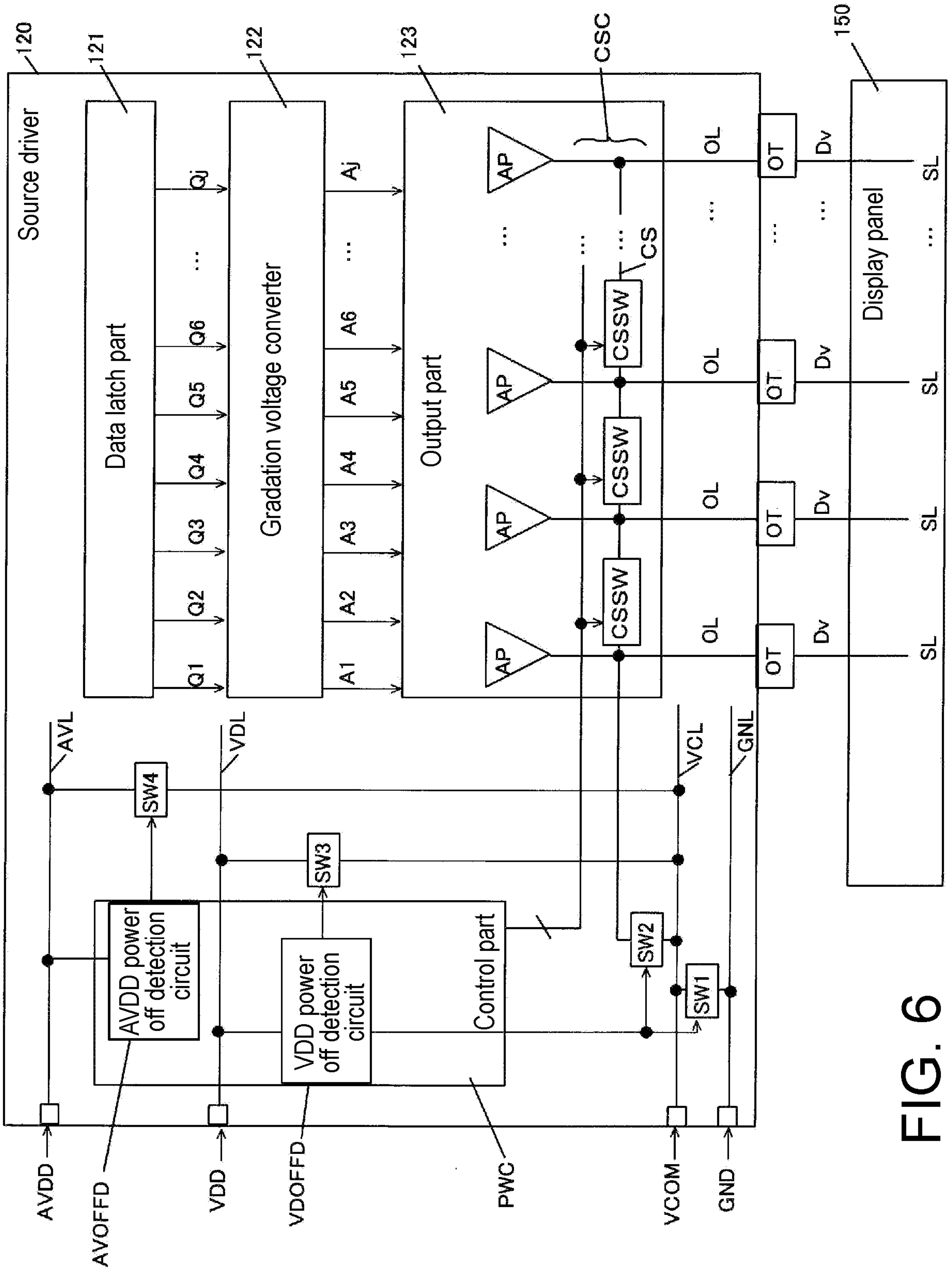
FIG. 6 is a block diagram illustrating an internal configuration of a source driver according to Example 3 of the disclosure.

FIG. 6 is a block diagram illustrating an internal configuration of the source driver 120 of Example 3. The present example is identical to Example 2 except for the following. In the configuration of the source driver 120 of Example 2 illustrated in FIG. 5, a normally-off fourth switch SW4 is further provided that is able to connect an AVDD voltage line AVL (second power supply line) that supplies the AVDD voltage (second voltage) to the VCOM voltage line VCL. The control part PWC further includes an AVDD power off detection circuit AVOFFD (second power off detection circuit) that detects stoppage of supply of the AVDD voltage from the AVDD voltage line AVL. When the AVDD power off detection circuit AVOFFD detects that the AVDD voltage line AVL is off, the control part PWC connects the AVDD voltage line AVL to the VCOM voltage line VCL.

In the present example, the control part PWC that controls the switch part (the first switch SW1 that is able to connect the charge share line CS to the VCOM voltage line VCL, the second switch SW2 that is able to connect the VCOM voltage line VCL to the ground line GNL, the third switch SW3 that is able to connect the VDD voltage line VDL to the VCOM voltage line VCL, and the fourth switch SW4) includes the VDD power off detection circuit VDOFFD that detects stoppage of supply of the VDD voltage from the VDD voltage line VDL. When the VDD power off detection circuit VDOFFD detects that the VDD voltage line VDL is off (the VDD voltage drops to the predetermined threshold), the control part PWC short-circuits a plurality of source lines SL by the charge share line CS, connects the charge share line CS and the VCOM voltage line VCL with the ground line GNL by the first switch SW1 and the second switch SW2, connects the VDD voltage line VDL to the VCOM voltage line VCL by the third switch SW3, and connects the AVDD voltage line AVL to the VCOM voltage line VCL by the fourth switch SW4.

In Example 3, by providing the fourth switch SW4 that is able to connect the AVDD voltage line AVL to the VCOM voltage line VCL when a drop in the AVDD potential of the AVDD voltage line AVL is detected in addition to the configuration of Example 2, when the AVDD potential drops, by turning on the first switch SW1, the second switch SW2, the third switch SW3 and the fourth switch SW4 of this switch group, the VCOM potential of the VCOM voltage line VCL can be quickly removed via the ground line GNL, the VDD voltage line VDL and the AVDD voltage line AVL (the AVDD voltage line AVL at this time is at the GND potential). Instead of the AVDD voltage line AVL, any signal line that is at the GND potential when the power is turned off, such as a HAVDD/GMA signal line, can be used.

According to Example 3, by detecting the VDD potential of the VDD voltage line VDL and the AVDD potential of the AVDD voltage line AVL when the power is turned off and using not only a path of the ground line GNL but also a path of the VDD voltage line VDL and the AVDD voltage line AVL for the VCOM voltage, the VCOM potential can be quickly set to the GND potential (shortening the turn-off time toff), and screen flickering can be quickly suppressed.

Figure 7:
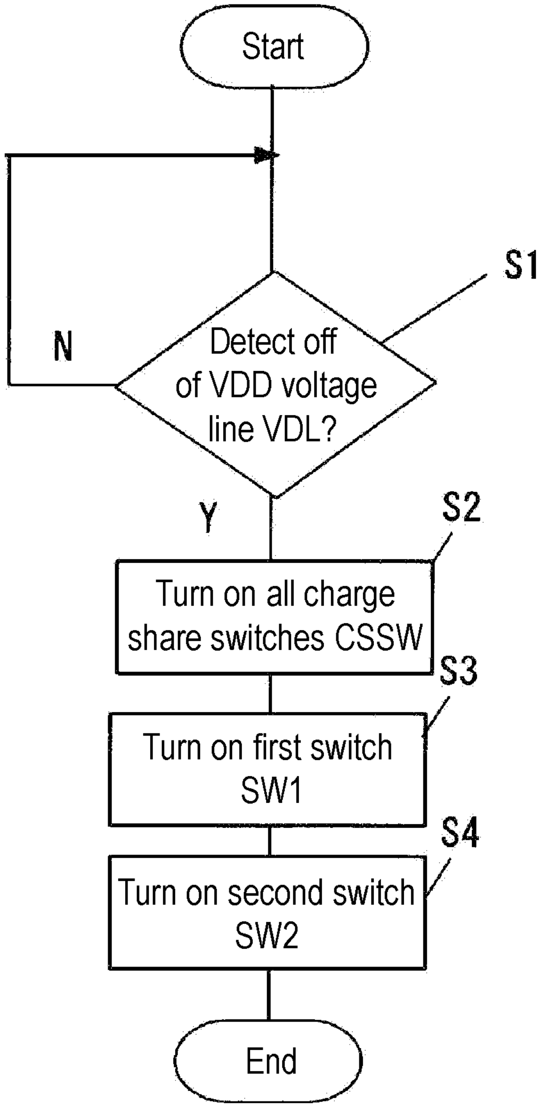
FIG. 7 is a flowchart illustrating an operation of the source driver according to Example 1 of the disclosure when the power is off.
Figure 8:
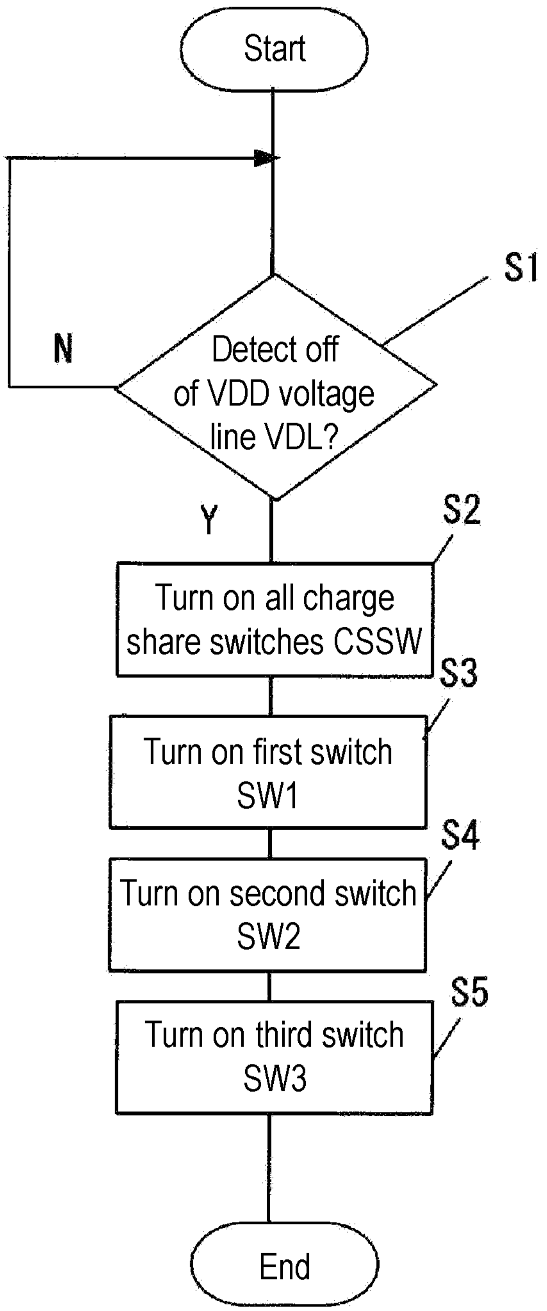
FIG. 8 is a flowchart illustrating an operation of the source driver according to Example 2 of the disclosure when the power is off.
Figure 9:
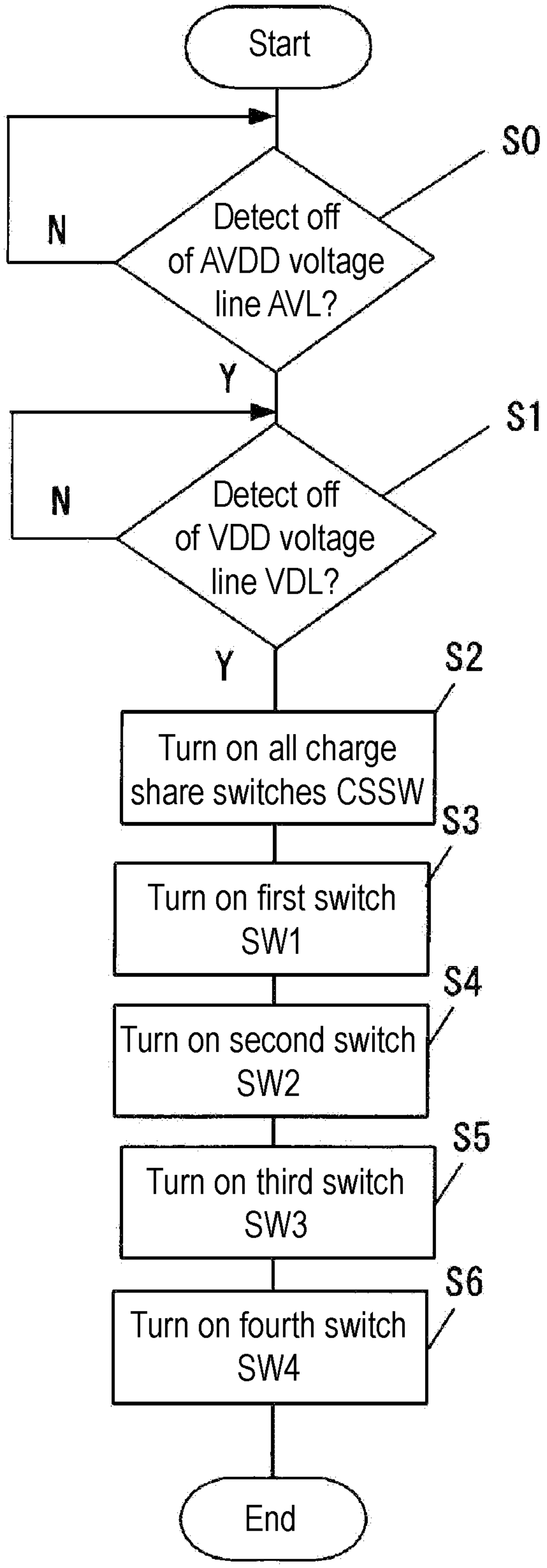
FIG. 9 is a flowchart illustrating an operation of the source driver according to Example 3 of the disclosure when the power is off.

FIG. 7, FIG. 8 and FIG. 9 are flowcharts illustrating an operation of the source driver 120 according to Example 1, Example 2, and Example 3, respectively, when the power is off.

As illustrated in FIG. 7, in Example 1, first, the VDD power off detection circuit VDOFFD of the control part PWC waits for the VDD voltage line VDL to turn off (the VDD voltage drops to the predetermined threshold) (step S1: N). Then, if the VDD power off detection circuit VDOFFD detects that the VDD voltage line VDL is off (step S1: Y), all the charge share switches CSSW are turned on and made conductive (step S2), the first switch SW1 is turned on (step S3), the second switch SW2 is turned on (step S4), the charge share line CS and the VCOM voltage line VCL are connected with the ground line GNL by the charge share switch CSSW, the first switch SW1 and the second switch SW2, and the VCOM voltage becomes ground potential.

As illustrated in FIG. 8, in Example 2, first, the VDD power off detection circuit VDOFFD of the control part PWC waits for the VDD voltage line VDL to turn off (the VDD voltage drops to the predetermined threshold) (step S1: N). Then, if the VDD power off detection circuit VDOFFD detects that the VDD voltage line VDL is off (step S1: Y), all the charge share switches CSSW are turned on and made conductive (step S2), the first switch SW1 is turned on (step S3), the second switch SW2 is turned on (step S4), the third switch SW3 is turned on (step S5), the charge share line CS and the VCOM voltage line VCL are connected with the ground line GNL by the charge share switch CSSW, the first switch SW1 and the second switch SW2, the VDD voltage line VDL is connected to the VCOM voltage line VCL by the third switch SW3, and the VCOM voltage becomes ground potential.

As illustrated in FIG. 9, in Example 3, first, the AVDD power off detection circuit AVOFFD of the control part PWC waits for the AVDD voltage line AVL to turn off (the AVDD voltage drops to a predetermined threshold) (step S0: N). Furthermore, the VDD power off detection circuit VDOFFD of the control part PWC waits for the VDD voltage line VDL to turn off (the VDD voltage drops to the predetermined threshold) (step S1: N). Then, if the AVDD power off detection circuit AVOFFD detects that the AVDD voltage line AVL is off (step S0: Y) and the VDD power off detection circuit VDOFFD detects that the VDD voltage line VDL is off (step S1: Y), all the charge share switches CSSW are turned on and made conductive (step S2), the first switch SW1 is turned on (step S3), the second switch SW2 is turned on (step S4), the third switch SW3 is turned on (step S5), the fourth switch SW4 is turned on (step S6), the charge share line CS and the VCOM voltage line VCL are connected with the ground line GNL by the charge share switch CSSW, the first switch SW1 and the second switch SW2, the VDD voltage line VDL is connected to the VCOM voltage line VCL by the third switch SW3, the AVDD voltage line AVL is connected to the VCOM voltage line VCL by fourth switch SW4, and the VCOM voltage becomes ground potential.

What is claimed is:

1. A source driver comprising:

a plurality of output amplifiers, supplying a plurality of pixel drive voltages respectively corresponding to a plurality of pixels to each of a plurality of source lines of a display device based on a video signal;

a charge share line, having a charge share switch provided to be able to connect output lines outputting the plurality of pixel drive voltages of the plurality of output amplifiers;

a common voltage line, connected to a common voltage electrode of the display device;

a first power supply line, supplying a first voltage;

a switch part, provided to be able to connect the charge share line and the common voltage line with the first power supply line; and a control circuit, comprising a first power off detection circuit that detects stoppage of supply of the first voltage from the first power supply line, wherein, in response to the first power off detection circuit detecting that the first power supply line is off, the control circuit short-circuits the plurality of source lines by the charge share line and connects the charge share line and the common voltage line with the first power supply line by the switch part.

2. The source driver according to claim 1, further comprising:

a ground line, connected to a ground potential, wherein the switch part is further configured to be able to connect the charge share line and the common voltage line with the ground line; and in response to the first power off detection circuit detecting that the first power supply line is off, the control circuit connects the charge share line and the common voltage line with the ground line by the switch part.

3. The source driver according to claim 2, wherein the switch part comprises a first switch that is able to connect the common voltage line to the ground line, a second switch that is able to connect the charge share line to the common voltage line, and a third switch that is able to connect the first power supply line to the common voltage line.

4. The source driver according to claim 3, further comprising:

a second power supply line, supplying a second voltage, wherein the switch part further comprises a fourth switch that is able to connect the second power supply line to the common voltage line; and the control circuit comprises a second power off detection circuit that detects stoppage of supply of the second voltage from the second power supply line, wherein, in response to the second power off detection circuit detecting that the second power supply line is off, the control circuit connects the second power supply line to the common voltage line.

5. A display apparatus comprising:

a display device; and a source driver, comprising:

a plurality of output amplifiers, supplying a plurality of pixel drive voltages respectively corresponding to a plurality of pixels to each of a plurality of source lines of the display device based on a video signal;

a charge share line, having a charge share switch provided to be able to connect output lines outputting the plurality of pixel drive voltages of the plurality of output amplifiers;

a common voltage line, connected to a common voltage electrode of the display device;

a first power supply line, supplying a first voltage;

a switch part, provided to be able to connect the charge share line and the common voltage line with the first power supply line; and a control circuit, comprising a first power off detection circuit that detects stoppage of supply of the first voltage from the first power supply line, wherein, in response to the first power off detection circuit detecting that the first power supply line is off, the control circuit short-circuits the plurality of source lines by the charge share line and connects the charge share line and the common voltage line with the first power supply line by the switch part.

6. The display apparatus according to claim 5, wherein the source driver further comprises a ground line connected to a ground potential;

the switch part is further configured to be able to connect the charge share line and the common voltage line with the ground line; and, in response to the first power off detection circuit detecting that the first power supply line is off, the control circuit connects the charge share line and the common voltage line with the ground line by the switch part.

7. The display apparatus according to claim 6, wherein the switch part comprises a first switch that is able to connect the common voltage line to the ground line, a second switch that is able to connect the charge share line to the common voltage line, and a third switch that is able to connect the first power supply line to the common voltage line.

8. The display apparatus according to claim 7, wherein the source driver further comprises a second power supply line that supplies a second voltage;

the switch part further comprises a fourth switch that is able to connect the second power supply line to the common voltage line; and the control circuit comprises a second power off detection circuit that detects stoppage of supply of the second voltage from the second power supply line, wherein, in response to the second power off detection circuit detecting that the second power supply line is off, the control circuit connects the second power supply line to the common voltage line.

* * * * *